Patented Nov. 7, 1939

2,178,924

UNITED STATES PATENT OFFICE 2,178,924

PROTEIN PLASTIC

Oswald Sturken, Closter, N. J., assignor, by mesne assignments, to Corn Products Refining Company, New York, N. Y., a corporation of New Jersey No Drawing. Application September 3, 1935, Serial No. 38,971

8 Claims. (Cl. 18—48)

My invention relates to improvements in the production of protein plastics. More specifically, my invention relates to the production of protein plastics which may be rapidly cured without the necessity of prolonged contact with formaldehyde solution or formaldehyde vapor.

In the past, protein plastics such as casein plastics have found many users in the light plastics field and have been found to be superior in a number of respects to other molded products. For example, plastics of this nature are readily machinable, and although water-resistant from a practical standpoint, are sufficiently water-permeable to lend themselves to dyeing operations. Since these plastics are, in general, light colored materials, the advantages of this latter property are apparent. Delicate shades may be secured which are impossible to obtain with any of the molding resins, and which up to the present time, have been secured only with resins prepared from much more expensive raw materials.

However, in spite of the many advantages of the protein plastics, these materials have not, up to the present time, enjoyed the economic advantage which they appear at first glance to possess. The reason for this has been primarily the prolonged cure which has been found to be necessary. Casein sheets, for example, are cured over periods of time ranging from a matter of days to a matter of months or even a year. This obviously vastly increases the cost of the plastics. It is necessary to keep a large amount of material on hand, equipment is tied up, and it is impossible to fill rush orders if particular properties are desired which are not possessed by the plastics on hand at the time.

Many attempts have been made to secure a protein plastic which could be cured in a manner so as to obviate the difficulties previously encountered. However, up to the present time, practically all of these attempts have met with failure. With the proteins thus far utilized, all attempts to mix formaldehyde directly with the protein in any considerable concentration have resulted in a rapid reaction which may reach the stage of final cure before even the preliminary plastifying is accomplished and which thus makes satisfactory plastification practically impossible. It has also been attempted to employ solid polymers of formaldehyde. Paraformaldehyde has been found to be very difficult to distribute throughout the protein so that in most cases only local curing is obtained and a weakened product results. With this material, also, the reaction has been found to be extremely difficult to control. If hexamethylenetetramine is employed the temperature necessary for cure is sufficiently high to give rise to a pronounced tendency of the plastic to discolor or even to partially decompose, and the products in any event are too water absorbent for practical purposes. Attempts have also been made to utilize various formaldehyde carriers or formaldehyde-yielding compounds, but these likewise have not met with complete success. It has therefore been thought necessary to mold the protein without the addition of any formaldehyde and then to cure the molded product either by soaking for a prolonged time in formaldehyde solution or by subjecting the product to the action of formaldehyde vapor for an equally long time.

I have now made the unexpected discovery that the protein zein behaves in an entirely different manner from the more common alcohol-insoluble proteins in its reaction with formaldehyde. I have found that zein reacts with formaldehyde very much more slowly than such other proteins and that zein may thus be mixed directly with formaldehyde, plasticized and subsequently cured by the action of heat and pressure. I have further found that a formaldehyde solution serves as a plastifying agent for zein. For example, zein containing 5% free formaldehyde will plastify much more readily than zein containing 1% formaldehyde with an equal amount of solvent present in both cases. A solution of formaldehyde may thus be employed as both plastifying agent and curing agent for zein.

My invention, therefore, comprises a process for producing plastics by mixing zein with a formaldehyde solution, preferably aqueous formaldehyde, plastifying the mixture at relatively low temperatures, forming the plastified mass into desired shapes, and finally curing at elevated temperatures. It will be seen that this process has many advantages over the methods previously employed. The long curing period required for the previous types of protein plastics is entirely eliminated. The reaction is under control at all times and may be stopped at any intermediate point so that machining blanks may be cut prior to the final cure, enabling waste material to be reused. The reactants used may be sufficiently purified so that a clear water-white plastic may be obtained. Further advantages of my process will be seen from the following description.

The process of my invention comprises, essentially, the following steps:

(a) Mixing the zein with aqueous formaldehyde
(b) Plastifying the mixture
(c) Forming the plastified mixture into the desired shapes
(d) Curing The mixing may be carried out in a dough mixer and the plastifying effected on suitable rolls such as a rubber mill or both of these steps may be carried out in a suitable extrusion apparatus. The plastified material taken from the rolls is then transferred to suitable heated molds for final shaping and curing. In view of the slowness of the curing, it is usually undesirable from a practical standpoint to complete the cure in these molds. The material may advantageously be removed at a stage in which it is still thermoplastic so that machining blanks or other desired forms may be cut and waste material reused. The final cure may then be effected simply by baking at an elevated temperature.

The initial mixture is formed simply by adding aqueous formaldehyde of the desired concentration to zein and mixing in any suitable manner, as for example, in a dough mixer. The amount of formaldehyde employed should be sufficient to effect a complete cure of the zein. I have found that 2% of free formaldehyde is sufficient in most cases and that amounts of 0.5% or less may be employed in certain instances. Amounts of 10% or more of free formaldehyde may be satisfactorily employed but it will be evident that much greater amounts will involve the use of a considerable proportion of water. In general, I prefer to use from 2 to 5% of free formaldehyde. The amount of water used will depend primarily upon the desired consistency of the plastified mass. I prefer generally to utilize about 20 parts of water per 100 parts of zein in the original mixture. Since the reaction of zein and formaldehyde is extremely slow at atmospheric temperatures, a thorough mixing may be obtained without any necessity for undue speed. The material should preferably be mixed until the particles show no further tendency to stick together. In an ordinary type of dough mixer this will usually be accomplished in about ten minutes.

The plastifying operation is preferably effected on cooled rolls, since heating is usually encountered in this operation due to friction and heat of reaction. It is desirable to maintain the temperature below that of rapid reaction, preferably below 60° C. If the mass is maintained below this temperature during the plastifying, substantially no curing will take place and the material may be rolled as long as necessary to secure perfect plastification. However, in order to reduce the time required for the following stage of the process, the curing reaction may be allowed to proceed to a partial extent during plastifying. For this purpose the material may be allowed to reach a higher temperature and may be maintained at such temperature for a shorter period of time. For example, a temperature of 65° C. and a time of 3–5 minutes might be employed for this purpose. Corresponding periods at higher or lower temperatures to effect the same degree of cure may, of course, also be used. In any event, the material after plastifying may be stored for considerable periods of time before subjecting it to curing in the following stages of the process. Even after partial reaction during plastifying, the curing reaction will proceed further only extremely slowly if the temperature is maintained below 40° C.

The plastified material may be cured in any suitable heated molds, as for example, in the usual sheeting press. The time and temperature required for curing will depend to some extent upon the amount of formaldehyde employed and upon the thickness of the material being molded. In general, however, it will be found that a complete cure may be obtained in about 15 minutes at 100–105° C. or corresponding periods at higher or lower temperatures. The temperature employed is not critical if the time is regulated accordingly, but I prefer to cure at approximately 100–105° C. since the reaction is relatively rapid at this temperature and there is no danger of decomposition or other undesirable effects which may be encountered at higher temperatures. As has been pointed out above, it is desirable from a practical standpoint to effect only a partial cure at this stage of the process since a complete cure requires sufficient time to limit seriously the output of a given mold. For this reason, I prefer to carry the reaction only partially to completion at this stage and to complete the cure by baking at atmospheric pressure. If it is desired to cut machining blanks or other shapes from the molded material, it is preferable to stop the reaction at this stage at a point at which the material is still thermoplastic. I have found that in general a reaction time of approximately 5 minutes at 100° C. will give a material suitable for cutting blanks and reusing the waste.

In carrying out the molding operation, I prefer to heat the molds to a temperature of about 70° C. prior to applying full pressure in order that good plastic flow may be secured and the mold will be completely filled. After the material has flowed into the mold, full pressure, for example 2000 lbs. per sq. in., may be applied and the temperature then raised to the curing point. In view of the moisture content of the material, it will of course be necessary to cool the molds prior to releasing the pressure to avoid blistering or general porosity of the product.

If the material is only partially cured in the molds, it may be stored for considerable periods of time at temperatures below 40° C. prior to further treatment, or it may be subjected directly to the final baking. If machining blanks are to be cut at this stage, this may be effected in any known manner, as for example, by the use of the usual cutting dies to produce disks from the molded sheets. The waste from such operations may be incorporated with new material on the plastifying rolls or added to plastified material when introduced into the molds. The final shapes to be baked may be introduced into any suitable oven and maintained at the baking temperature under atmospheric pressure. Since the material is still thermoplastic at this stage, the usual care should be exercised to prevent deforming during the first stages of the baking. The baking should preferably be effected at temperatures below 90° C. to prevent porosity caused by rapid reaction induced by too high temperatures. Temperatures from 60–90° C. are generally satisfactory, but I prefer to employ a temperature of about 80° C. At this temperature a full cure may be obtained in from 8–10 hours. Corresponding shorter or longer periods of time should of course be employed at higher or lower temperatures.

My invention may further be illustrated by the following specific example: 100 parts of dry powdered zein were mixed with 20 parts of a water solution containing 2 parts of free formaldehyde (15 parts of water plus 5 parts of 40% aqueous formaldehyde). This mass was mixed in a dough mill for 10 minutes, at the end of which time the particles ceased to show a tendency to stick together. The material was then transferred to cooled plastifying rolls, one roll being maintained at 20° C. and the other at 40° C. The temperature of the rolls was allowed to rise to 65° C. and was maintained at this point for 4 minutes, after which the material was removed from the rolls and placed in a heated sheeting press. The temperature was raised to 70° C. to secure plastic flow, and a pressure of 2000 lbs. per sq. inch was then applied and the temperature raised to 100° C. After 5 minutes at this temperature, the mold was cooled to 30° C. and the material removed. The molded sheet was then cut into disks by means of cylindrical cutting dies and the disks were baked at 80° C. for 9 hours. The disks thus obtained were hard and tough, having a tensile strength of 12,000 lbs. per sq. inch. The color and finish were both satisfactory and the disks were found to be readily machinable.

In general, the products obtained by the process of my invention are hard, tough plastics having good strength and elasticity and a satisfactory finish. The materials are sufficiently tough and elastic for machining and show no tendency to gum up the tool when it becomes hot. The appearance of the products is extremely satisfactory, and if pure materials are employed a clear water-white plastic will be obtained. The addition of white pigments to such compositions gives an excellent white plastic which may readily be dyed according to known procedures.

It is to be understood, of course, that my invention is not to be construed as limited to the particular materials or procedures specified above. Various equivalents will naturally suggest themselves to those skilled in the art. By "formaldehyde", as used herein, is intended not only free formaldehyde but also formaldehyde solutions and compounds which liberate formaldehyde under the conditions specified. Equivalent process steps may likewise be employed, for instance, the mixing and plastifying might be effected in an extrusion machine, in which case the extruded forms could be cured by baking without intermediate molding. A further modification would be to combine the plastifying and preliminary curing by effecting these steps on heated calender rolls, thus obtaining sheets suitable for final baking. The process is suitable for coating, impregnating, laminating and such like operations which involve the use of zein as a plastic material. Likewise, the compositions of the original mixture may be modified in any manner known to the art. Any of the usual modifying agents such as plasticizers, lubricants, pigments, etc. may be employed. In general, it may be said that known equivalents and any modifications of procedure which would occur to one skilled in the art may be employed without departing from the scope of my invention.

My invention now having been described, what I claim is:

1. A process for producing a plastic which comprises plastifying a mixture in which the reactive elements consist essentially of zein and formaldehyde in the form of an aqueous solution, forming the plastified material into suitable shapes, and curing the shaped masses.

2. A process for producing a plastic which comprises plastifying a mixture in which the reactive elements consist essentially of zein and more than 0.5% of formaldehyde in the form of an aqueous solution, forming the plastified material into suitable shapes, and curing the shaped masses.

3. A process for producing a plastic which comprises plastifying at temperatures not substantially above 65° C., a mixture in which the reactive elements consist essentially of zein and more than 0.5% formaldehyde in the form of an aqueous solution, forming the plastified material into suitable shapes, and curing the shaped masses.

4. A process for producing a plastic which comprises mixing zein with at least 2% of formaldehyde in the form of an aqueous solution, plastifying the mixture for a time and at a temperature corresponding to 3-5 minutes at 65° C., forming the plastified material into suitable shapes, and curing the shaped masses.

5. A process for producing a plastic which comprises mixing zein with from 2 to 5% of formaldehyde in the form of an aqueous solution, plastifying the mixture for a time and at a temperature corresponding to 3-5 minutes at 65° C., forming the plastified material into suitable shapes, partially curing the shaped masses under pressure at 100-105° C., and baking the partially cured masses at 60-90° C. and at atmospheric pressure.

6. A process for producing a plastic which comprises mixing zein with 20% of an aqueous formaldehyde solution, containing 2% of formaldehyde based on the weight of the zein, plastifying the mixture for 3-5 minutes at 65° C., forming the plastified material into suitable shapes, partially curing the shaped masses under 2000 lbs. pressure at 100° C. for 5 minutes, and completing the cure by baking for 8-10 hours at 80° C. and at atmospheric pressure.

7. A process for producing a plastic which comprises plastifying for three to five minutes at a temperature not substantially in excess of 60° C. a mixture in which the reactive elements consist of essentially zein and formaldehyde in the form of an aqueous solution, forming the plastified material into suitable shapes and curing the shaped masses.

8. Process of utilizing zein which comprises making a reactive mixture consisting essentially of zein, formaldehyde and water and thereafter treating the same to solidify it.

OSWALD STURKEN.